United States Patent [19]

Schafer

[11] 4,258,662

[45] Mar. 31, 1981

[54] SLOTTED PANEL ASSEMBLY

[76] Inventor: Kenneth L. Schafer, Rte. 3, Box 73, Le Sueur, Minn. 56058

[21] Appl. No.: 68,937

[22] Filed: Aug. 23, 1979

[51] Int. Cl.³ ............................................. A01K 1/00
[52] U.S. Cl. .................................... 119/28; 52/309.1
[58] Field of Search ................ 119/28, 16; 52/309.1, 52/309.16, 309.15

[56] References Cited

U.S. PATENT DOCUMENTS

| 2,711,231 | 6/1955 | Spangler | 189/34 |
|---|---|---|---|
| 3,172,508 | 3/1965 | Doering | 189/34 |
| 3,301,147 | 1/1967 | Clayton et al. | 94/13 |
| 3,704,561 | 12/1972 | Meyer | 52/309.16 X |
| 3,815,550 | 6/1974 | Becker | 119/28 |
| 3,921,350 | 11/1975 | Van Schoyck | 119/28 X |

FOREIGN PATENT DOCUMENTS 579343 9/1976 Switzerland ............................... 119/28

Primary Examiner—Hugh R. Chamblee
Attorney, Agent, or Firm—Burd, Bartz & Gutenkauf

[57] ABSTRACT

A slotted floor section for supporting animals, as hogs and cattle. The floor section has a plurality of longitudinal members having plywood cores located in side-by-side laterally spaced positions. A plurality of transverse members are located adjacent the bottom of the longitudinal members. The longitudinal and transverse members are covered with a plastic reinforced with fibers. The transverse members have a plurality of lugs which laterally space the longitudinal members. Connecting structures attach the transverse members to the longitudinal members. A granular material embedded in the top portion of the plastic material provides the top surface of the longitudinal members with a rough texture to enhance animal footing.

17 Claims, 6 Drawing Figures

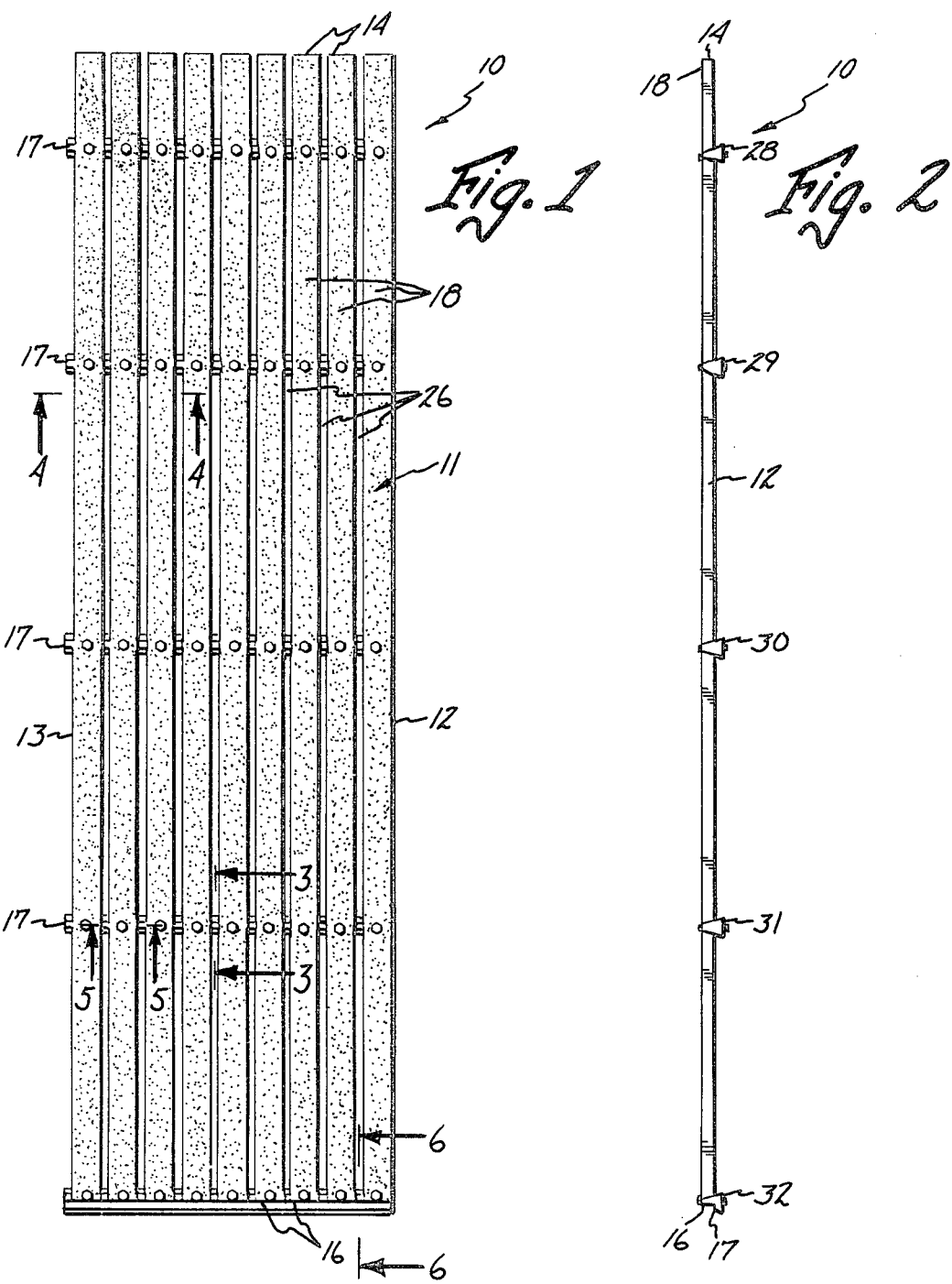

SLOTTED PANEL ASSEMBLY

SUMMARY OF INVENTION

The invention is related to a slotted panel assembly or floor section. A plurality of floor sections are used in hog farrowing crates and nursery pens to support hogs in a clean, comfortable and safe manner. The floor sections are located side-by-side and end-to-end to provide a slotted floor over a supporting surface, as a concrete floor. The floor section is a generally rectangular structure having a plurality of longitudinal members spaced from each other to provide the floor section with rows of slots. Each row of slots has a plurality of spaced end-to-end slots extended along the longitudinal direction of the section. Each longitudinal member has a one-piece longitudinal core of plywood or like material which is entirely covered with a coating or outer layer of plastic reinforced with glass fibers, commonly called Fiberglass. The longitudinal members are arranged in laterally spaced side-by-side positions with the slots located between adjacent members. A plurality of transverse members are located adjacent the bottom of the longitudinal members. Each transverse member has a transverse core entirely covered with plastic having fiber or like reinforcing means. The transverse members have upwardly directed spacer lugs or projections that are located between adjacent longitudinal members to space the adjacent longitudinal members from each other. Fastener means secure the transverse members to the longitudinal members thereby holding the longitudinal members in their side-by-side laterally spaced positions. One side of each transverse member has a lateral spacing projection or end which serves to separate the floor section from an adjacent floor section. The top surface of the longitudinal members is irregular or gritted. The gritted surface is formed with a layer of granular material located in the top portion of the plastic covering the longitudinal core. A gel coating of plastic material covers the granular material. The gel coating over the granular material has an irregular or gritted top surface to enhance animal footing.

The floor section is structurally strong, yet lightweight, making it easy to handle. An area can be covered with floor sections with a minimum of time and labor as the sections are place side-by-side and end-to-end. The plastic covering of the longitudinal and transverse cores is corrosion resistant and does not absorb or retain liquids. The animals remain dry and clean. The plastic coverings also have low thermal conductivity and do not become brittle or soft with extreme changes in ambient temperatures. This enables the floor section to be used in a wide variety of installations at an economical cost.

IN THE DRAWINGS

FIG. 1 is a top plan view of the slotted floor section of the invention;

FIG. 2 is a side elevational view of the right side of FIG. 1;

FIG. 3 is an enlarged sectional view taken along the line 3–3 of FIG. 1;

DESCRIPTION OF PREFERRED EMBODIMENT

Figure 4:
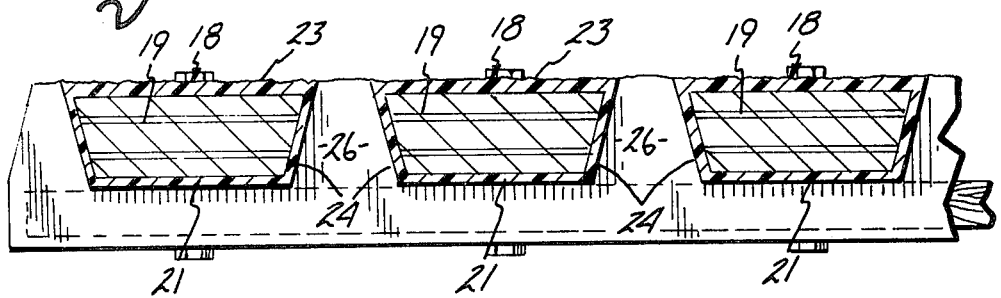
FIG. 4 is an enlarged sectional view taken along the line 4–4 of FIG. 1.

Referring to FIGS. 1 and 2, there is shown a slotted panel assembly indicated generally at 10. Panel assembly 10 is hereinafter described as floor section 10 for supporting animals. Floor section 10 is used with additional floor sections to provide a slotted floor for animal installations including dairy and beef cattle and hogs. Floor section 10 is used with additional sections located end-to-end and side-by-side to cover a desired area, such as a room or pen for accommodating animals. The following description is limited to a single floor section 10.

Floor section 10 is a generally rectangular and flat slotted unitary structure 11. In one form, structure 11 has a width of 61 cm (2 feet), a length of 244 cm (8 feet), and a thickness of approximately 3 cm (1.25 inch). Structure 11 can have other sizes and shapes. Structure 11 has parallel linear sides 12 and 13 joined to transverse ends 14 and 16. Side 13 has lateral projections or knobs 17 which serve as spacers to separate side 13 from an adjacent side of the next floor section or a wall. Structure 11 has a plurality of first longitudinal members 18 extended the entire length of the floor section 10. Members 18 are generally flat and elongated and are located side-by-side in a generally common plane. Each member 18 can have a width of 6 cm (2.5 inches) and a length of 244 cm (8 feet). Each member 18 has a longitudinal core 19 of plywood or like structural material and a coating or covering jacket 21 surrounding the core. Coating 21 is a layer of plastic reinforced with glass fibers or like reinforcing material. Other types of coatings can be applied to core 19.

As shown in FIG. 4, the opposite longitudinal sides 24 of members 18 taper or diverge downwardly toward the floor section supporting surface. The taper is about 15 degrees from a vertical line extended through the upper outer edge of side 24. Adjacent sides 24 are spaced from each other providing longitudinal slots 26. The taper or upper portions of slots 26 are narrower than the bottom of the slots. The tapered sides 24 facilitate movement and flow of material through slots 26 between sides of members 18. A plurality of side-by-side longitudinal slots or openings 26 extend through structure 11 so that animal wastes and other materials flow and are worked through slots 26 by the animals. Slots 26 are located in parallel rows. Each row has a plurality of slots. For example, eight rows of slots can be located between sides 12 and 13. Four slots can be located in each row. The length and width of each slot 26 can vary. For example, each slot can have a length of 61 cm (2 feet) and a width of 1.3 cm (0.5 inch). Other slot arrangements and dimensions can be used in structure 11.

Figure 6:
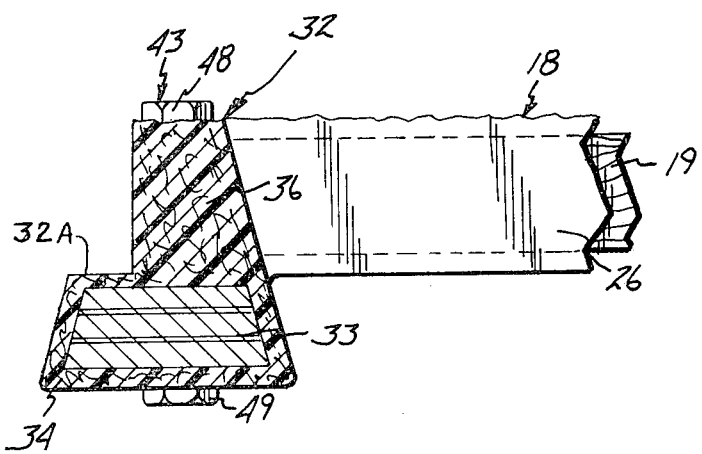
FIG. 6 is an enlarged sectional view taken along the line 6–6 of FIG. 1.

Returning to FIGS. 1 and 2, transverse members 28, 29, 30, 31, and 32 extend transversely of or across the bottoms or members 18. Transverse member 29 extends transversely across transverse members 18 spaced inwardly from the ends thereof. As shown in FIG. 6, member 32 extends transversely across the lower or left ends of longitudinal members 18 and projects outwardly therefrom providing a step or shoulder 32A. An end of an adjacent floor section rests on shoulder 32A. Transverse members 29, 30, and 31 extend across intermediate sections of longitudinal members 18 with the member 30 extended across the middle of longitudinal members 18. Additional transverse members can be used to reinforce and hold longitudinal members 18 in their spaced side-by-side positions. As shown in FIG. 1, the left end of each transverse member 27-32 has projections 17 which serve as spacers to provide longitudinal slots between adjacent or side-by-side floor sections.

Figure 5:
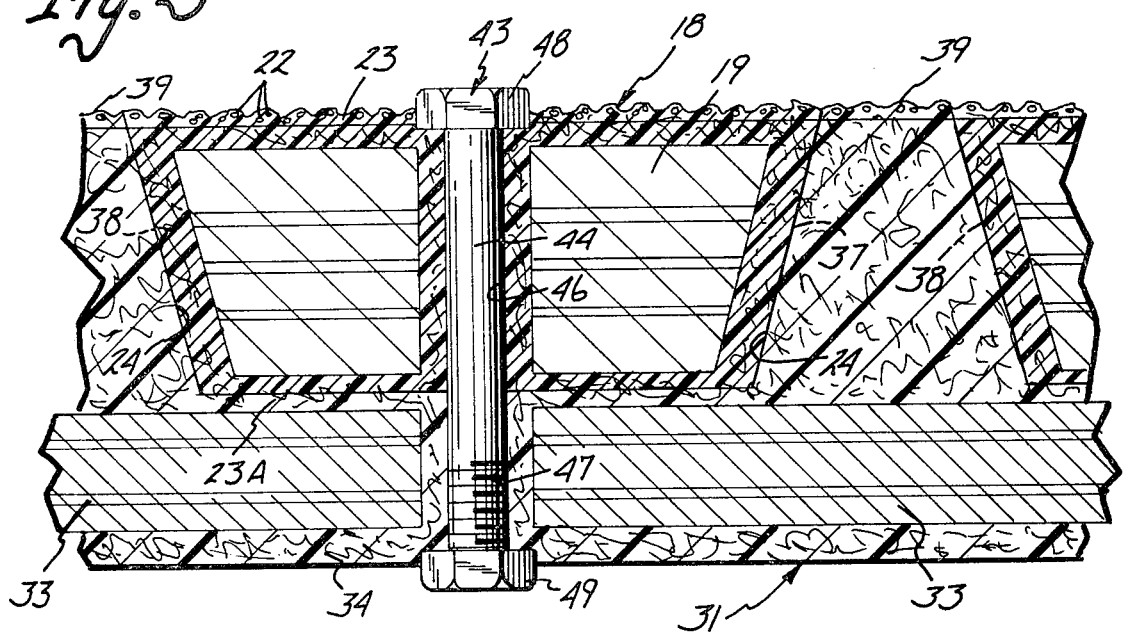
FIG. 5 is an enlarged sectional view taken along the line 5–5 of FIG. 1.

As shown in FIGS. 3, 5, and 6, transverse members 27-32 each have a core 33 of structural materal, as plywood, metal rod, and the like, enclosed or encapsulated within a coating or skin 34 of plastic reinforced with reinforcing means, as glass fibers. Each transverse member 27-32 has a plurality of upwardly directed lugs or projections 36 that fit between the adjacent sides 24 of longitudinal members 18. Projections 36 are truncated pyramids having tapered first and second sides 37 and 38 that are located in surface engagement with portions of the tapered sides 24 of adjacent longitudinal members 18. As shown in FIG. 5, projections 36 extend upwardly between adjacent longitudinal members 18 to space the members 18 laterally from each other. The complementary tapers of projections 36 and sides 24 of the longitudinal members 18 allow for manufacturing variations and insure a close and strong relationship between the transverse members and longitudinal members. Projection 36 has a top 39 that is generally in the same plane as the top surface or plastic gel coating 23 on top of the longitudinal members 18. Projection 36 has third and fourth sides 41 and 42 that converge or taper in an upward direction, as shown in FIGS. 3 and 6. Tapered sides 41 and 42 facilitate the movement of material, as solid and liquid manure, through slots 26.

Cores 19 and 33 of members 18 and 27-32 are entirely covered with or encapuslated within protective plastic coatings or skins. Plastic coatings are a plastic resin reinforced with glass fibers. The plastic does not absorb water or animal liquids and is acid resistant, wear resistant, and inhibits growth of bacteria and fungi. The plastic is also a tough material that does not become brittle in cold weather or soft in not weather. A suitable plastic is a thermo setting plastic having carbon or glass fiber reinforcement. Examples are glass-reinforced ABS with glass fiber loading levels up to 40%, glass-reinforced styrene-acrylonitrile, glass-reinforced polypropylene, and glass-reinforced polycarbonate. Other types of plastics can be used.

Returning to FIG. 5, a layer of granular material 22, as grit, sand, abrasive material, and the like, is located in the top portion of plastic coating 21. A plastic or gel coating 23 covers granular material 22. Granular material 22 can be mixed with the gel coating 23 and then applied to the top of longitudinal members 18. Granular material 22 provides the top or exposed upper surface of gel coating 23 with an irregular or rough shape which provides a traction surface for animals. The texture of the upper surface of coating 23 can vary from heavy to smooth. The type and amount of granular material can be changed to alter the texture of the upper surface of coating 23.

Longitudinal members 18 and transverse members 27-32 are secured together with an attaching means or fastening means indicated generally at 43. Fastening means can be plastic adhesives or bonding materials, or the plastic coatings merged together. Fastening means 43, as shown in FIG. 5, is an upright bolt 44 extended through holes 46 and 47 in longitudinal member 18 and transverse member 31. Bolt 44 has a head 48 bearing against the top of longitudinal member 18 and a nut 49 bearing against the bottom of transverse member 31. Head 48 and nut 49 can be located in recesses in the plastic. Other types of fasteners, as wood screws, can be used to connect longitudinal members 18 to transverse members 27-32. Fastening means 43 locates the lugs 36 between adjacent longitudinal members 18. The tapered sides 37 and 38 of the lugs 36 bear against the oppositely tapered sides 24 of the longitudinal members so that lugs 36 laterally space the longitudinal members. The lugs 36 also prevent lateral movement of the longitudinal members 18 so that, in use, holes 46 and 47 for the bolts 49 are not enlarged, as there is no lateral or shearing force on the bolts.

Floor section 10 is made in a mold having a plurality of longitudinal grooves for accommodating cores 19 and spacing the cores in side-by-side positions. Cores 19 are cut with tapered longitudinal side edges before they are placed into the grooves of the mold. A first layer of plastic mixed with glass fibers is initially sprayed into the mold. The cores 19 can be wrapped with glass fiber cloth and coated with a plastic resin. The holes are drilled through the cloth and cores before the resin is applied so that the inside walls forming the holes are coated with resin. The cores 19 are then placed in their longitudinal grooves on top of the plastic. After all of the cores are in place, a second application of plastic containing glass fibers is applied to the cores to encapsulate the cores in a layer of plastic containing glass fibers. The abrasive or grit material is then spread on top of the longitudinal cores. A plastic or gel coating is then applied over the top of the grit to provide an irregular or texturized top surface. The longitudinal members 18 are then subjected to heat to cure the plastic. After the plastic is cured, members 18 are removed from the mold. The sides and edges of the longitudinal members 18 are trimmed to eliminate projections and sharp edges.

The transverse members 27-32 are identical in structure and are made in a mold. The core 33 is encapsulated in a plastic containing glass fibers. The plastic also forms the lugs 36.

The longitudinal members 18 and transverse members 27-32 are secured together with fastening means 43. Holes 46 and 47 are drilled through the longitudinal members 18 and transverse members 27-32 before the plastic coating is applied to the members so that the inside of the holes is covered with plastic. This protects the wood core from water and liquid manure. The bolts are threaded into the nuts to complete floor section 10.

Floor section 10 is used in conjunction with additional floor sections to provide a floor for a pen for accommodating animals. Projections 17 provide space or openings between the adjacent floor sections so that animal waste and liquids can flow between the sections. The irregular top surface of longitudinal members 18 provides traction and footing for the animals, as opposed to slippery surfaces that can result in sprains and injury to the animals. The plastic covering members 18 and 27-32 are acid resistant and resists the growth of bacteria and fungi. Futhermore, the plastic does not absorb water and is wear resistant.

While there has been shown and described an embodiment of the floor sections of the invention, it is understood that changes in the size, materials, and structure can be made by those skilled in the art without departing from the invention. The invention is defined in the following claims.

The embodiments of the invention in which an exclusive property or privilege is claimed are defined as follows:

1. A slotted panel floor assembly for covering a support surface comprising: a plurality of longitudinal members, each longitudinal member having a longitudinal core and plastic means reinforced with fibers covering the entire core, said longitudinal member having an upper surface, a bottom, and downwardly and inwardly converging longitudinal sides; a plurality of longitudinally spaced transverse members extended transversely across the bottom of the longitudinal members, each transverse member having a transverse core, plastic means reinforced with fibers covering the entire transverse core, each transverse member having a top, a bottom engageable with said surface to support the panel assembly on said surface, upwardly and inwardly converging sides upwardly directed first projections, spaced along the top of the transverse member and an end second projection extended laterally away from an outside longitudinal member to space the panel assembly from an adjacent panel assembly, each first projection having upwardly converging sides engageable with the converging sides of adjacent longitudinal members to laterally space the adjacent longitudinal members from each other and locate the longitudinal members in side-by-side longitudinal positions relative to each other, said upwardly converging sides of each first projection being generally continuous with the downwardly and inwardly converging sides of the longitudinal members; and means connecting the transverse members to the longitudinal members and holding the longitudinal members between adjacent first projections on each of the transverse members.

2. The assembly of claim 1 wherein: the longitudinal core is plywood.

3. The assembly of claim 1 wherein: the longitudinal core is plywood and the transverse core is plywood.

4. The assembly of claim 1 wherein: the longitudinal core is a wood member, and the plastic means covering the longitudinal core is a plastic reinforced with glass fibers.

5. The assembly of claim 1 wherein: the transverse core is plywood.

6. The assembly of claim 1 wherein: each of the first projections have a top generally co-extensive with the upper surfaces of adjacent longitudinal members.

7. The assembly of claim 1 wherein: the plastic means covering the transverse core is a plastic reinforced with glass fibers.

8. The assembly of claim 7 wherein: the transverse core is a wood member.

9. The assembly of claim 1 including: granular means in the plastic means of the longitudinal members below the top surface thereof providing the longitudinal members with a gritted top surface.

10. The assembly of claim 1 wherein: the means connecting the transverse members to the longitudinal members include bolt means extended through said longitudinal and transverse members.

11. The assembly of claim 1 wherein: the means connecting the transverse members to the longitudinal members include means integrally attaching the transverse and longitudinal members.

12. A slotted panel floor assembly for covering a support surface comprising: a plurality of longitudinal members, each longitudinal member having an upper surface, a bottom and longitudinal sides, said longitudinal sides tapering downwardly and inwardly from the upper surface; a plurality of longitudinally spaced transverse members extended transversely across the bottom of the longitudinal members, each transverse member having a top, a bottom engageable with said surface to support the panel assembly on said surface, upwardly and inwardly converging sides, upwardly directed first projections, and an end second projection extended laterally away from an outside longitudinal member to space the panel assembly from an adjacent panel assembly, each first projection having upwardly and inwardly tapered sides engageable with the sides of adjacent longitudinal members to laterally space the adjacent longitudinal members from each other and locate the longitudinal members in side-by-side longitudinal positions relative to each other, said upwardly converging sides of each first projection being generally continuous with the downwardly and inwardly converging sides of the longitudinal members; and means connecting the transverse members to the longitudinal members.

13. The assembly of claim 12 wherein: each first projection of the transverse member has a top located generally coextensive with the upper surface of adjacent longitudinal members.

14. The assembly of claim 12 wherein: at least one of said transverse members is attached to the one of the ends of the longitudinal members, said one of said transverse members having a transverse shoulder for accommodating ends of longitudinal members of an adjacent panel floor assembly.

15. The assembly of claim 12 including: plastic means covering the top surface of the longitudinal members and granular means in the plastic means below the top surface thereof providing the longitudinal members with a gritted top surface.

16. The assembly of claim 12 wherein: the means connecting the transverse members to the longitudinal members include bolt means extended through said longitudinal transverse members.

17. The assembly of claim 12 wherein: the means connecting the transverse members to the longitudinal members include means integrally attaching the transverse and longitudinal members.

* * * * *